(12) United States Patent
Grzesiak et al.

(10) Patent No.: US 8,997,467 B2
(45) Date of Patent: Apr. 7, 2015

(54) SYSTEM AND METHOD FOR POST-SHUTDOWN TEMPERATURE MANAGEMENT AND PURGE

(71) Applicant: Caterpillar Inc., Peoria, IL (US)

(72) Inventors: Rebecca Grzesiak, Montgomery, IL (US); Michael J. Braun, Montgomery, IL (US)

(73) Assignee: Caterpillar Inc., Peoria, IL (US)

( * ) Notice: Subject to any disclaimer, the term of this patent is extended or adjusted under 35 U.S.C. 154(b) by 91 days.

(21) Appl. No.: 13/838,965

(22) Filed: Mar. 15, 2013

(65) Prior Publication Data
US 2014/0260199 A1  Sep. 18, 2014

(51) Int. Cl.
| | | |
|---|---|---|
| *F01N 3/00* | (2006.01) | |
| *F01N 3/02* | (2006.01) | |
| *F01N 3/10* | (2006.01) | |
| *F01N 3/20* | (2006.01) | |
| *F01N 3/08* | (2006.01) | |

(52) U.S. Cl.
CPC .............. *F01N 3/206* (2013.01); *F01N 3/0871* (2013.01)

(58) Field of Classification Search
USPC .................................. 60/286, 295, 298, 324
See application file for complete search history.

(56) References Cited

U.S. PATENT DOCUMENTS

| 6,192,677 B1 | 2/2001 | Tost | |
|---|---|---|---|
| 2009/0139207 A1* | 6/2009 | Reiners et al. | 60/274 |
| 2012/0036838 A1* | 2/2012 | Furuya | 60/285 |
| 2013/0291523 A1* | 11/2013 | Shah et al. | 60/287 |

FOREIGN PATENT DOCUMENTS

| JP | 2008-169711 A | 7/2008 |
|---|---|---|
| JP | 2012-017687 A | 1/2012 |
| WO | WO 2011/162688 A1 | 12/2011 |
| WO | WO 2011/162690 A1 | 12/2011 |
| WO | WO 2011/162692 A1 | 12/2011 |

* cited by examiner

*Primary Examiner* — Kenneth Bomberg
*Assistant Examiner* — Dapinder Singh
(74) *Attorney, Agent, or Firm* — Leydig, Voit & Mayer, Ltd.

(57) ABSTRACT

A machine includes an engine having a coolant system, an electrical system, and an exhaust system. A diesel exhaust fluid (DEF) injector provides DEF into the exhaust system. The DEF injector includes a housing that forms a coolant passage therethrough. The coolant passage is adapted to accommodate a flow of coolant through the coolant passage for cooling the DEF injector. A DEF pump is arranged to provide DEF to the DEF injector from a reservoir during operation of the engine. A power management module is associated with the electrical system, the DEF injector and the DEF pump. An auxiliary power unit is associated with the power management module and is configured to remain active after the engine electrical system has been deactivated. The power management module is configured to cause a purge of the DEF from the DEF injector when the engine is shut down.

18 Claims, 4 Drawing Sheets

SYSTEM AND METHOD FOR POST-SHUTDOWN TEMPERATURE MANAGEMENT AND PURGE

TECHNICAL FIELD

This disclosure relates generally to engine systems and, more particularly, to exhaust after-treatment systems and methods.

BACKGROUND

One known method for abating certain diesel engine exhaust constituents is by use of an exhaust after-treatment system that utilizes Selective Catalytic Reduction (SCR) of nitrogen oxides. In a typical SCR system, urea or a urea-based water solution is mixed with exhaust gas. In some applications, a urea solution is injected directly into an exhaust passage through a specialized injector device. The injected urea solution mixes with exhaust gas and breaks down to provide ammonia ($NH_3$) in the exhaust stream. The ammonia then reacts with nitrogen oxides ($NO_x$) in the exhaust at a catalyst to provide nitrogen gas ($N_2$) and water ($H_2O$).

As can be appreciated, SCR systems require the presence of some form of urea close to the engine system such that the engine can be continuously supplied during operation. Various urea or urea-solution delivery systems are known and used in engine applications. In known urea injection systems, temperature-related challenges may arise that can affect the electronic and mechanical hardware used to inject the urea. For example, given that the urea is typically injected directly into the engine's exhaust system, the proximity of a urea injector device to hot engine exhaust may lead to injector component overheating, both during system operation as well as after heat saturation following a hot engine shut-down. Moreover, for systems using water-based urea solutions, freezing of the urea solution may cause component damage when the engine is not operating. Other issues include corrosion due to the nature of the urea solution on urea injection components and other, surrounding engine and vehicle components.

SUMMARY

The disclosure describes, in one aspect, a machine. The machine includes an engine having a coolant system, an electrical system, and an exhaust system. A diesel exhaust fluid (DEF) injector is disposed to provide metered amounts of DEF into the exhaust system. The DEF injector includes a housing that forms a coolant passage therethrough. The coolant passage is adapted to accommodate a flow of coolant for cooling the DEF injector. A DEF pump is arranged to provide DEF to the DEF injector from a reservoir during operation of the engine. A power management module is associated with the electrical system, the DEF injector and the DEF pump. An auxiliary power unit is associated with the power management module and is configured to remain active after the engine electrical system has been deactivated. The power management module is configured to cause a purge of the DEF from the DEF injector when the engine is shut down.

In another aspect, the disclosure describes a method for thermal management and post-shutdown purge of a fluid from an injector in a machine having an engine. The engine includes a coolant system and an electrical system. The method comprises storing electrical energy in an auxiliary power unit from the electrical system during engine operation, and activating the auxiliary power unit to deliver electrical power after engine shut-down and deactivation of the electrical system. A fluid pump is powered to purge the fluid from the injector, and a temperature of the injector is sensed. Based on the temperature, a secondary cooling system is activated to reduce an injector temperature when the sensed temperature is or is expected to exceed a threshold temperature. The secondary cooling system draws electrical power for operation from the auxiliary power unit. A flow of electrical power to the fluid pump and to the secondary cooling system is controlled by a power management module that is associated with the auxiliary power unit, the fluid pump, and the secondary cooling system.

In yet another aspect, the disclosure describes a method for avoiding overheating of a diesel exhaust fluid (DEF) injector disposed in an engine exhaust system following a hot engine shut-down. The method includes activating an auxiliary power unit, which stores electrical energy therein during engine operation, to deliver electrical power after engine shut-down and deactivation of an engine electrical system. A temperature associated with the DEF injector is sensed. When and while the temperature exceeds a predetermined threshold, energy from the auxiliary power unit is used to operate a fan providing a cooling air flow to the DEF injector and to operate a coolant pump that circulates a flow of coolant fluid through a passage formed in a housing of the DEF injector. The flow of electrical power to the fan and to the coolant pump is controlled by a power management module that is associated with the auxiliary power unit.

DETAILED DESCRIPTION

This disclosure relates to power management systems for machines and, more particularly, to power management systems and methods that provide a controlled cool-down and purge functionality to urea-solution injection and related components of a SCR system associated with the engine. The power management systems disclosed herein are effective in maintaining power and functionality to certain machine systems.

Figure 1:
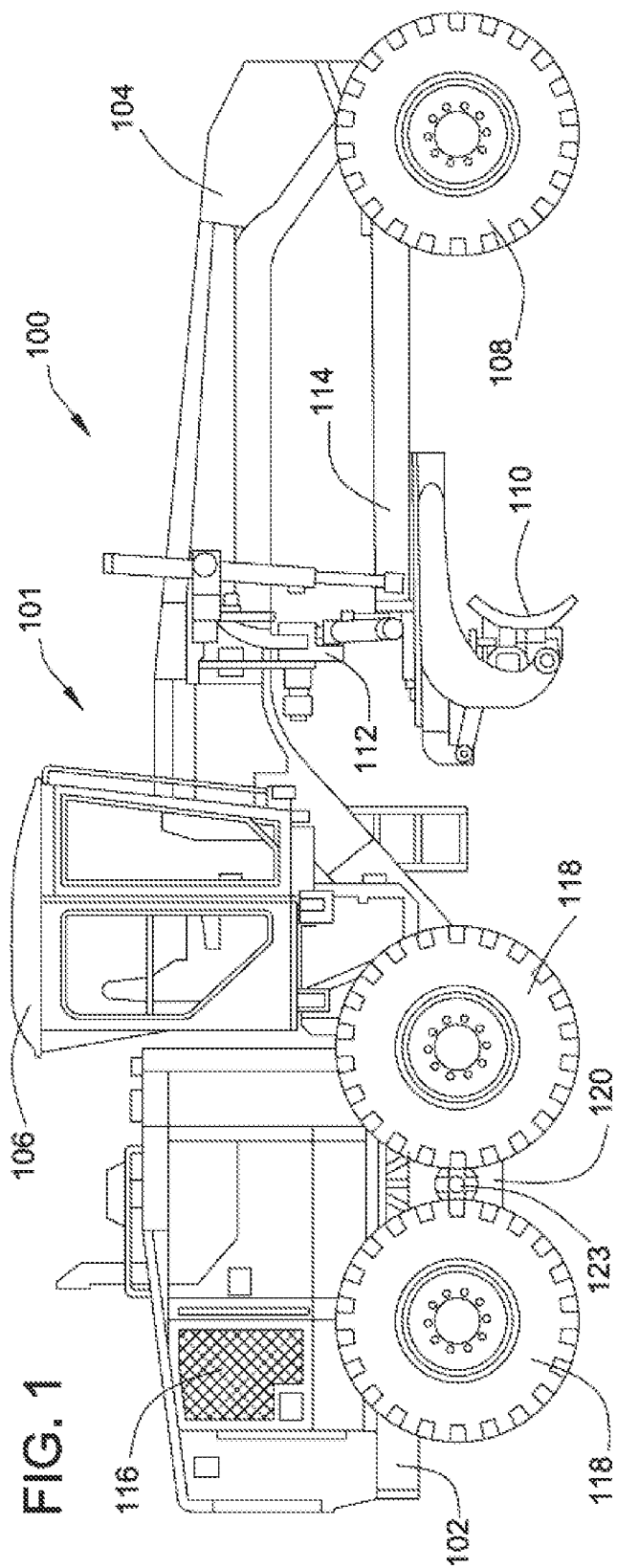
FIG. 1 is an outline view of a machine in accordance with the disclosure.

A side view of a machine 100, in this example a motor grader 101, is shown in FIG. 1. The term "machine" is used generically to describe any machine having at least one drive wheel that is directly driven by a motor connected to the wheel, for example, by use of electrical or hydrostatic power, or is alternatively driven by mechanical means by an engine through a transmission. The motor grader 101 shown in FIG. 1 generally includes a two-piece frame made up of an engine frame 102 and an implement portion 104. Alternatively, the motor grader 101 may include a single frame piece. The engine frame 102 in the embodiment shown is connected to the implement portion 104 by a pivot (not shown). The implement portion 104 includes an operator cab 106 and two idle wheels 108 (only one visible) that contact the ground. The engine frame 102 contacts the ground through two drive wheels 118, which are connected to one another by a tandem beam 120 that is connected to the engine frame 102 at a pivot 123. A shovel or blade 110 is suspended along a mid-portion of the implement portion 104. The blade 110 can be selectively adjusted to engage the ground at various heights and angles to achieve a desired grade or contour while the motor grader 101 operates. Adjustment of the position of the blade 110 is accomplished by a system of actuators, generally denoted in FIG. 1 as 112, while support for the loading experienced by the blade 110 during operation is accomplished by a bar 114, which pivotally connects the implement portion 104 to the blade 110.

The engine frame 102 supports an engine (shown and described relative to FIG. 2, below), which is protected from the elements by an engine cover 116. The engine provides the power necessary to propel the motor grader 101 as well as to operate the various actuators and systems of the motor grader 101. As can be appreciated, other machines may have different configurations and/or various other implements associated therewith. The engine cover 116 includes grates and other openings that allow air to pass over and cool engine components.

Figure 2:
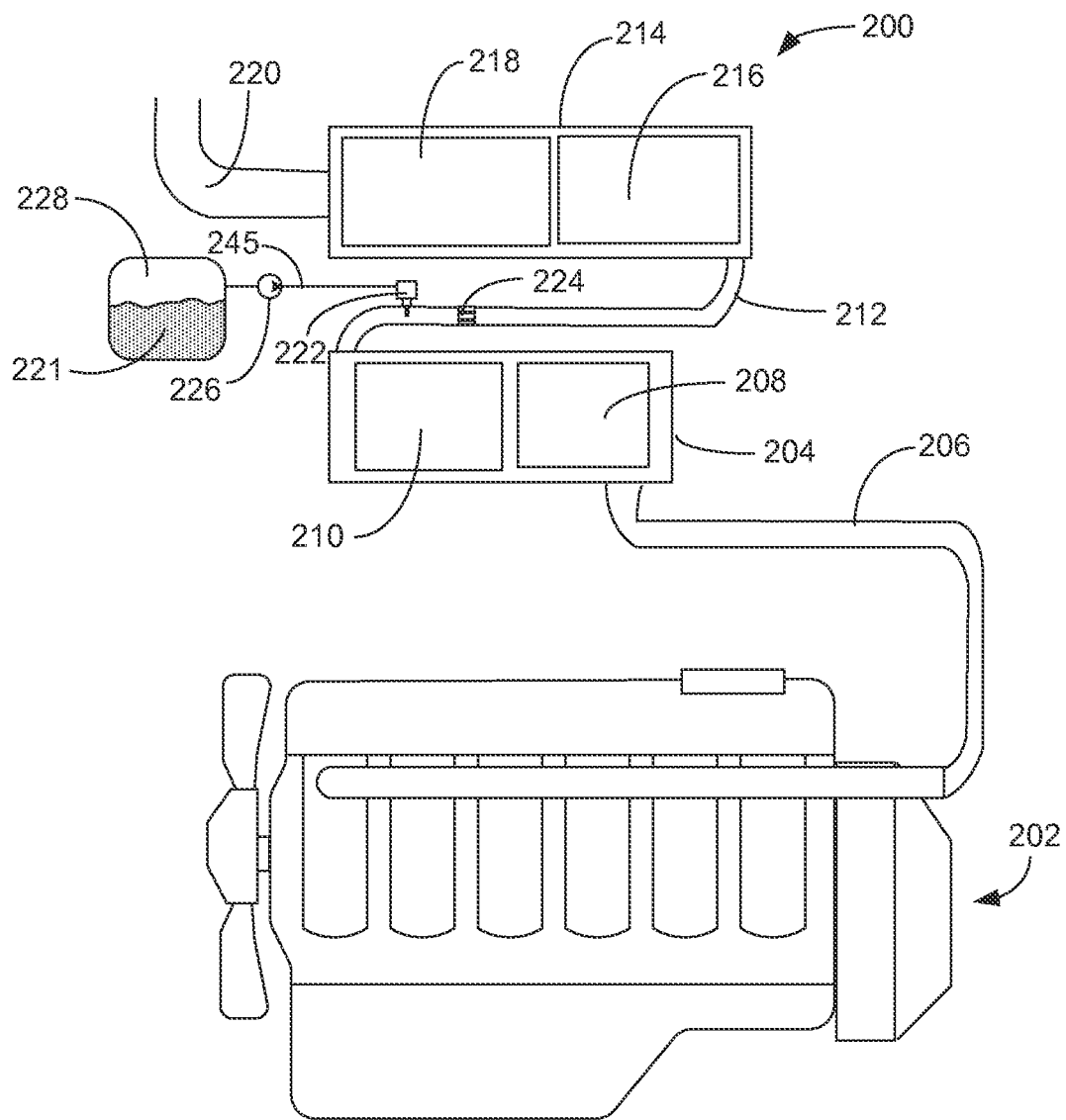
FIG. 2 is a block diagram of an engine having a SCR system in accordance with the disclosure.

FIG. 2 is a block diagram of an exhaust after-treatment system 200 associated with the engine 202 of the machine 100. The system 200 may be modularly packaged as shown in the illustrated embodiment for retrofit onto existing engines or, alternatively, for installation on new engines. In the illustrated embodiment, the system 200 includes a first module 204 that is fluidly connected to an exhaust conduit 206 of the engine 202. During engine operation, the first module 204 is arranged to internally receive engine exhaust gas from the conduit 206. The first module 204 may contain various exhaust gas treatment devices such as a diesel oxidation catalyst (DOC) 208 and a diesel particulate filter (DPF) 210, but other devices may be used. Exhaust gas provided to the first module 204 by the engine 202 may first pass through the DOC 208 and then through the DPF 210 before entering a transfer conduit 212.

The transfer conduit 212 fluidly interconnects the first module 204 with a second module 214 such that exhaust gas from the engine 202 may pass through the first and second modules 204 and 214 in series before being released at a stack 220 that is connected to the second module. In the illustrated embodiment, the second module 214 encloses a SCR catalyst 216 and an Ammonia Oxidation Catalyst (AMOX) 218. The SCR catalyst 216 and AMOX 218 operate to treat exhaust gas from the engine 202 in the presence of ammonia, which is provided after degradation of a urea-containing solution injected into the exhaust gas in the transfer conduit 212.

More specifically, a urea-containing water solution, which is commonly referred to as diesel exhaust fluid (DEF) 221, is injected into the transfer conduit 212 by a DEF injector 222. The DEF 221 is contained within a reservoir 228 and is provided to the DEF injector 222 by a pump 226. As the DEF 221 is injected into the transfer conduit 212, it mixes with exhaust gas passing therethrough and is thus carried to the second module 214. To promote mixing of DEF with exhaust, a mixer 224 may be disposed along the transfer conduit 212.

As can be appreciated, the location of the DEF injector 222 on the transfer conduit 212 can expose the injector to relatively high temperatures due to heating from exhaust gas during operation. To avoid damage to the DEF injector 222 during operation, a flow of engine coolant is provided through the injector. In the absence of such coolant flow while the injector is hot or subject to a heating condition, thermal issues in the injector may arise, for example, if the engine is shut-down while hot. Also, thermal issues may arise due to freezing of the DEF within the injector 222. These and other issues can be avoided by the systems and methods described hereinafter.

Figure 3:
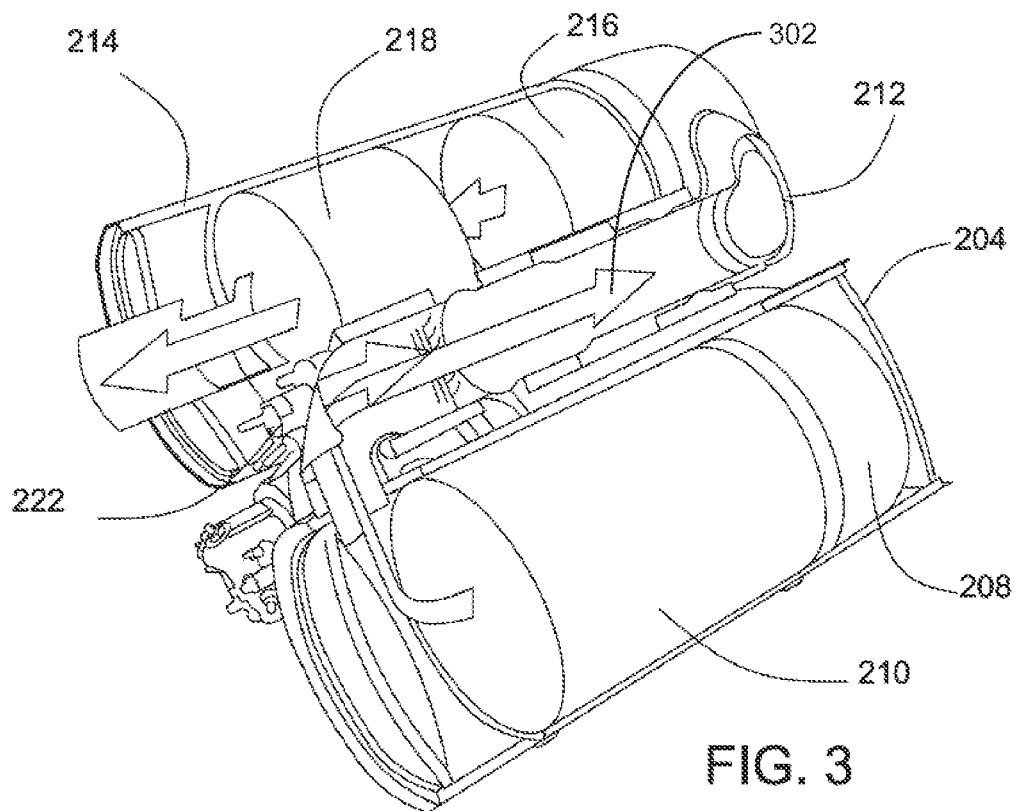
FIG. 3 is a partially sectioned outline view of an exhaust treatment module in accordance with the disclosure.
Figure 4:
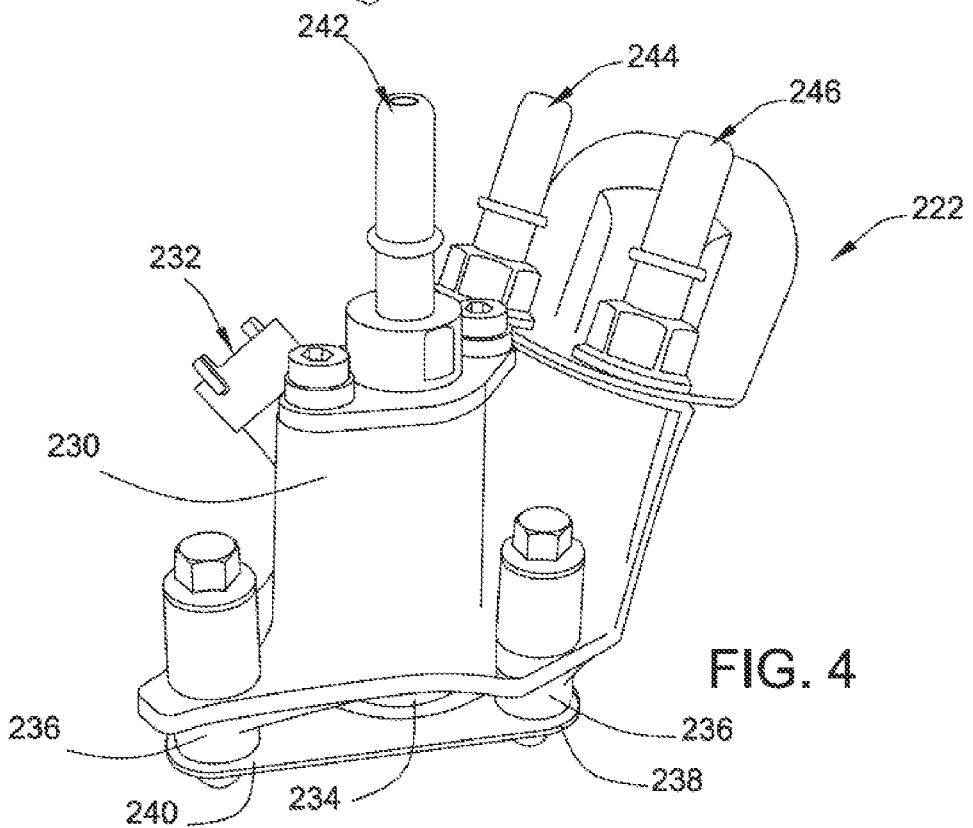
FIG. 4 is an outline view of an injector for diesel exhaust fluid (DEF) in accordance with the disclosure.
Figure 5:
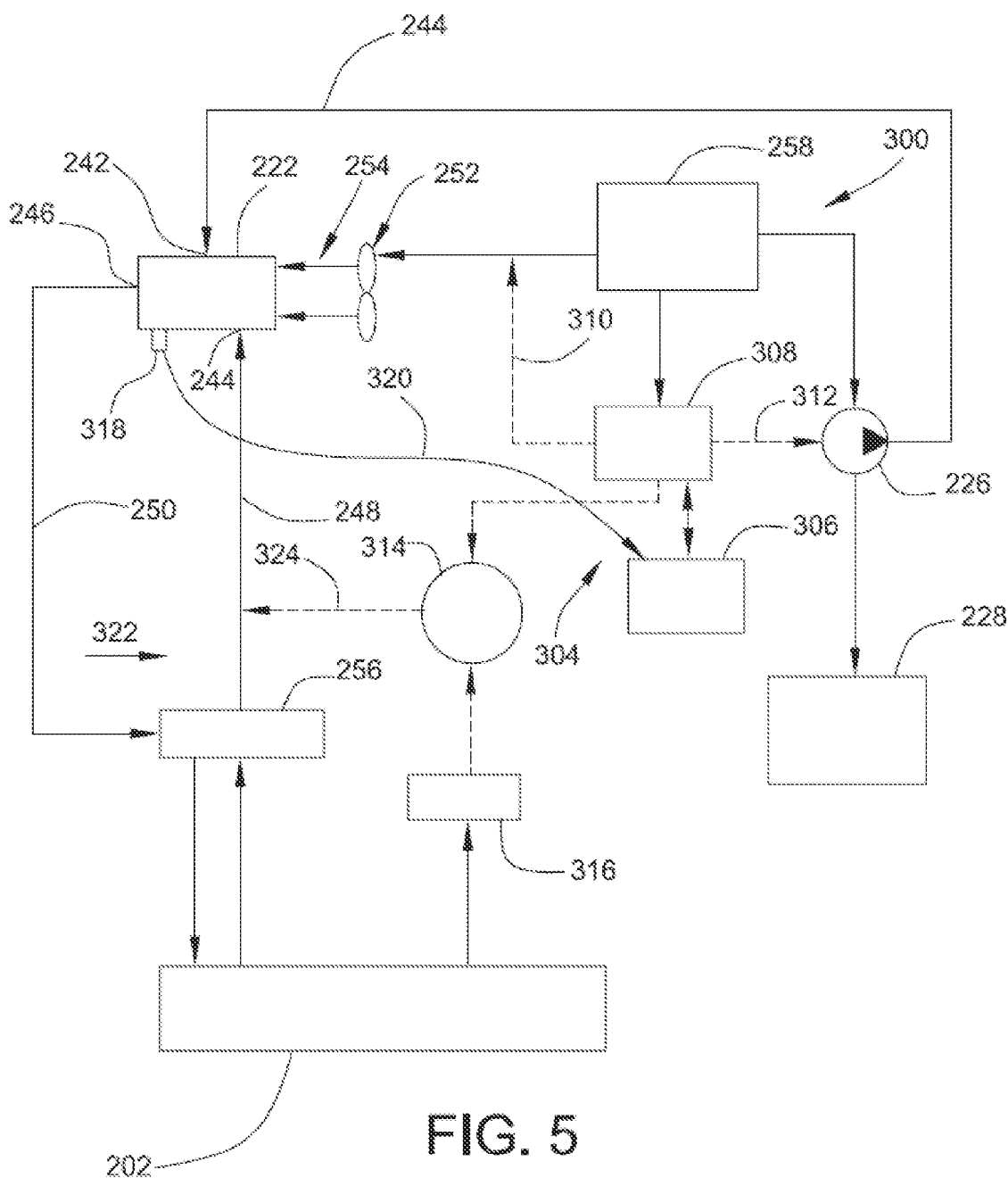
FIG. 5 is a schematic diagram of a post-shutdown temperature management and purge system in accordance with the disclosure.

FIG. 3 is a partially sectioned outline view of the system 200, and FIG. 4 is an outline view of the DEF injector 222 removed from the system 200 for illustration. FIG. 5 is a schematic diagram view of a temperature management and purge system 300. In reference to these figures, the present disclosure is aimed at addressing thermal issues associated with the DEF injector 222 and surrounding systems. For high temperature conditions, the disclosure provides, at least in part, a system and method for managing heat input to the injector, especially under hot engine shut-down conditions. For low temperature conditions, the sytem ensures that DEF that is present within the injector 222 is purged after engine shutdown such that freezing issues are avoided. The system 300 accomplishes these tasks by providing a self-sustaining power source to auxiliary cooling and purging systems, which advantageously do not draw from machine power after shutdown but have sufficient power to operate cooling and purging systems.

More specifically, the system 200 is packaged such that the position of the DEF injector 222 is relatively external to the surrounding structures and exposed to a convective cooling air flow both during operation of the engine as well as post-shutdown. In reference to FIG. 3, where same or similar structures as corresponding structures previously described are denoted by the same reference numerals previously used for simplicity, the first and second modules 204 and 214 are disposed next to one another, with the transfer conduit 212 disposed between them. The DEF injector 222 is disposed on an upstream end of the transfer conduit 212 relative to a direction of exhaust gas flow 302. An outline view of a DEF injector 222 embodiment is shown in FIG. 4.

In this embodiment, the injector 222 includes a body portion 230 that houses an electrical actuator (not shown), which can receive command signals through an electrical connector 232 connected to the body portion 230. The actuator is connected to a valve member 234. The valve member 234, when open, permits a flow of DEF out of the injector 222 and into the transfer conduit 212. To create a conductive heat transfer barrier between the body portion 230 and the exhaust system to which the injector 222 is connected to, a plurality of spacers 236 are used to space apart the body portion 230 from a mounting flange 238, thus creating a gap 240 between the body portion 230 of the injector 222 and the mounting flange 238.

DEF is supplied to the valve member 234 through the body portion 230. A DEF inlet conduit 242 is connected to a conduit 245 (FIG. 2), which is in turn fluidly connected to the reservoir 228. Under certain operating conditions, the flow of DEF through the injector 222 between the inlet conduit 242 and the valve member 234 acts to convectively cool the body portion 230 during operation. Additional convective cooling can further be provided by routing engine coolant or another cooling fluid through internal passages formed in the body portion 230. In the illustrated embodiment, an internal cooling passage (not shown) extending through the body portion 230 is fluidly accessible through inlet and outlet coolant ports 244 and 246. Each coolant port 244 and 246 is connected to a respective conduit 248 and 250 (FIG. 5), which is adapted to receive a flow of coolant therethrough for convectively cooling the body portion 230.

In reference now to FIG. 5, a schematic diagram for a temperature management system 300 for the DEF injector 222 is shown. The DEF injector 222 receives DEF fluid through the conduit 248, as is also shown in FIG. 2, and receives coolant through the conduits 248 and 250. A fan 252 provides a cooling airflow 254 that convectively cools the DEF injector 222 externally. When the engine 202 is operating, coolant flow to and from the DEF injector 222 is controlled through a coolant control module 256. Power to operate the fan 252 is provided through a machine electrical system 258, which also provides power to operate the pump 226 that provides DEF to the injector 222, when the engine 202 is operating. However, when the engine 202 is shut down, power to the machine electrical system 258 is interrupted. Under hot engine operating conditions, heat saturation of the injector 222 after engine shutdown may increase the temperature of the injector 222 beyond desirable limits, especially if the injector is placed high in the engine compartment below an engine cover and away from ventilation openings, as is sometimes the case. To avoid such issues, the system 300 includes a secondary power source 304, which is generally independent from the machine electrical system 258 and is configured to retain power safely, even after the machine is shutdown.

In the illustrated embodiment, the system 300 includes a power storage device or battery array 306. The battery array 306 is configured to be charged with electrical power from the machine electrical system 258 during engine operation, but to be isolated therefrom when the engine 202 is not operating. When the machine electrical system 258 is shut down, the battery array 306, directly or through a power management module 308, is configured to provide power to certain post-shutdown temperature management and purge systems and components.

More specifically, the power management module 308 is connected to and configured to operate the fan 252 via an auxiliary ventilation power line 310. The power management module 308 is further connected to and configured to operate the DEF pump 226 and, optionally, the injector 222. A secondary coolant pump 314 is connected via a valve 316 to the coolant system of the engine 202, and an outlet of the secondary coolant pump 314 is connected to the inlet coolant conduit 248 of the injector 222. The valve 316 may be an electrically activated valve, or may alternatively be a pressure-activated valve, which opens to provide coolant from the engine at the inlet of the pump 314 when the pump 314 is activated.

During operation, the system 300 may be activated when the engine 202 has been shut down, which also deactivates the machine electrical system 258. A temperature sensor 318 disposed to measure a component temperature, which is indicative of a thermal state of critical components and systems of the system 300 such as the DEF injector 222, provides a temperature signal 320 to the power management module 308. The power management module 308 in the illustrated embodiment includes an electronic controller in addition to other electrical components such as switches and relays. The electronic controller integrated within the power management module 308 may be a single controller or may include more than one controller disposed to control various functions and/or features of a machine. For example, a master controller, that is used to control the overall operation and function of the machine, may be cooperatively implemented with a motor or engine controller, used to control the engine 202 and/or components and systems of the system 300. In this embodiment, the term "controller" is meant to include one, two, or more controllers that may be associated with the machine 100 and that may cooperate in controlling various functions and operations of the machine 100 (FIG. 1). The functionality of the controller, while shown conceptually herein to include various discrete functions for illustrative purposes only, may be implemented in hardware and/or software without regard to the discrete functionality shown. Accordingly, various interfaces of the controller are described relative to components of the system 300 shown in the block diagram of FIG. 5. Such interfaces are not intended to limit the type and number of components that are connected, nor the number of controllers that are described.

During operation, the power management module 308 may activate the pump 226, fan 252, coolant pump 314 and DEF injector 222, as required, after engine shut down, such that various housekeeping operations can be carried out that can decrease the likelihood of component damage due to high or low temperature effects. For example, when the engine shuts down while DEF is present within the injector 222 and related fluid conduits, the power management module 308 may activate the DEF pump 226 in a reverse direction, and also open a valve of the injector 222, to effectively purge the system or, stated differently, evacuate any DEF fluid present in the DEF fluid conduits and within the injector 222, and return all such DEF back to the reservoir 228.

The power management module 308 may further manage post-shutdown temperature of various system components by selectively causing active cooling to be provided. More specifically, two cooling systems shown in the present embodiment may be used. The first is an air-cooling system that includes the fan 252 providing the cooling air flow 254. In one embodiment, when the temperature indicated by the temperature sensor 318 is determined by the controller within the power management module 308 to be above a threshold temperature or, alternatively, to be rising at a rate that is expected to result in a saturation temperature that will be above the threshold temperature, the power management module 308 may activate a DEF cooling circuit 322.

The DEF cooling circuit 322 may share engine coolant conduits of the cooling circuit normally used during engine operation, for example, conduits 248 and 250, and provide alternative means for supplying and routing coolant therethrough while the engine 202 is not operating. In the illustrated embodiment, the DEF cooling circuit 322 includes the valve 316, which is connected to a coolant source of the engine 202 and is configured to route coolant therefrom to the pump 314. The pump 314, as previously discussed, may be an electrical pump that operates on power provided from the battery array 306 through the power management module 308. As shown, the battery array 306 may receive a trickle charge during engine operation from the power management module 308, and may discharge to operate the pump 314 during a post-shutdown thermal management mode.

Coolant drawn from the engine through the valve 316 by the pump 314 is provided by a transfer conduit 324 to the inlet coolant conduit 248 of the DEF injector 222. Thus, a coolant flow path may be defined from the engine 202, through the valve 316 and pump 314, through the transfer conduit 324, and then through the inlet coolant conduit 248, the DEF injector 222, the return coolant conduit 250 (FIG. 5), and, finally, the engine 202. This circuit may operate to convectively remove heat energy collecting in the DEF injector 222 after engine shut-down, such that an over-temperature saturation condition may be avoided. This secondary coolant flow path through the DEF injector 222 may be used while a system temperature is or is expected to remain above a threshold temperature. When the actual or expected DEF injector temperature falls below the threshold limit, the system may be deactivated. In one embodiment, the system may also be activated during engine operation under a failure condition, for example, when the power management module 308 determines that a system failure or environmental condition exists that can cause an overheating condition of the DEF injector 222. In other words, the system 300, by its autonomy, can provide auxiliary or emergency cooling function to the DEF injector 222 when normal machine systems are unable or incapable of providing sufficient DEF injector cooling.

INDUSTRIAL APPLICABILITY

The present disclosure is applicable to systems for performing housekeeping operations for mechanical and electronic components and systems after shut-down of the main operation of a machine. The particular embodiments described herein relate to the purging operation of a working fluid from an injector in an SCR system for treating the exhaust gas of an internal combustion engine, and to a thermal management operation to avoid component overheating, especially in a hot shut-down mode.

In one disclosed embodiment, a power management module having an independent power source that can remain active after machine shut-down is used to power certain components that can carry out the purging of DEF from a respective injector. Such purging may be completed promptly after engine shut-down, for example, within two minutes, and is useful in avoiding cracking issues under freezing conditions, leaks when the machine has not operated for a prolonged period, or any other failure or effect of keeping DEF within the injector and the related conduits after the engine has shut-down. To this end, the power management module activates and powers a DEF pump in reverse, and also opens a DEF injector valve, to purge any DEF remaining in the relevant conduits and return it for containment within a DEF reservoir.

The power management module is also configured to provide cooling to the DEF injector following a hot-engine shut-down. To this end, the power management module may monitor a DEF injector temperature and, on the basis of the temperature or a derivative thereof, activate an air- and/or water-cooled system to control DEF injector temperature. In one embodiment, the air-cooled system employs a fan that can be operated from the independent power source to provide a cooling air flow to the DEF injector. Additionally, a water-cooled system may use an electric pump to pass coolant through the DEF injector when the engine is not operating. Either or both of these cooling arrangements may be operated for as long as necessary to avoid an over-temperature condition in the DEF injector.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A machine, comprising:
   an engine having a coolant system, an electrical system having a power storage device, and an exhaust system associated therewith;
   a diesel exhaust fluid (DEF) injector disposed to provide metered amounts of DEF into the exhaust system; the DEF injector including a housing that forms a coolant passage therethrough, said coolant passage adapted to accommodate a flow of coolant therethrough for cooling the DEF injector;
   a DEF pump arranged to provide DEF to the DEF injector from a reservoir during operation of the engine;
   a power management module that includes a controller associated with the electrical system, the DEF injector and the DEF pump;
   an auxiliary power unit that includes a battery array, is separate from the power storage device of the electrical system, and is associated with the controller, said auxiliary power unit being configured to remain active after the engine electrical system has been deactivated;
   a temperature sensor disposed to measure a temperature associated with a temperature of the DEF injector and provide a temperature signal indicative of said temperature to the controller of the power management module,
   an electrically operated coolant pump associated with the power management module and responsive to commands from the controller, said coolant pump being powered by the auxiliary power unit following engine shut-down and operating to route an auxiliary flow of coolant through the coolant passage of the housing, the auxiliary flow of coolant being routed to the housing separately from the coolant system of the engine,
   wherein the controller is programmed to cause a purge of the DEF from the DEF injector when the engine is shut down, and wherein the power management module is further configured to activate said coolant pump using power provided by the auxiliary power unit when the temperature signal is indicative of a condition in which the temperature of the DEF injector exceeds or is estimated to exceed a threshold temperature after the engine electrical system is shut down.

2. The machine of claim 1, wherein the power management module operates to purge the DEF from the DEF injector following engine shut-down by:
   providing power to operate the DEF pump from the auxiliary power unit;
   causing the DEF pump to operate in reverse such that it draws DEF from the DEF injector and deposits the DEF to the reservoir;
   causing a DEF injector valve to open while DEF is purged.

3. The machine of claim 1, wherein the engine is configured to provide a flow of coolant through the coolant passage of the housing when the engine is operating, said flow of coolant operating to cool the DEF injector.

4. The machine of claim 1, further comprising a valve disposed between the coolant pump and the engine, said valve being operable to fluidly connect the coolant pump with the coolant system of the engine when the coolant pump is activated.

5. The machine of claim 1, further comprising a fan disposed to provide a cooling air flow to the DEF injector, wherein said fan is connected to the electrical system and configured to provide the cooling air flow during engine operation.

6. The machine of claim 5, further comprising:
a temperature sensor disposed to measure a temperature associated with a temperature of the DEF injector and provide a temperature signal indicative of said temperature to the power management module,
wherein the power management module is further configured to activate said fan using power provided by the auxiliary power unit when the temperature signal is indicative of a condition in which the temperature of the DEF injector exceeds or is estimated to exceed a threshold temperature.

7. A method for thermal management and post-shutdown purge of a fluid from an injector in a machine having an engine, the engine having a coolant system and an electrical system associated therewith, the engine electrical system including a power storage device, the method comprising:
storing electrical energy in an auxiliary power unit that includes a battery array from the electrical system during engine operation, the auxiliary power unit being separate from the power storage device of the engine electrical system;
activating the auxiliary power unit to deliver electrical power after engine shut-down and deactivation of the engine electrical system that includes the power storage device;
powering a fluid pump to purge the fluid from the injector using electrical power from the auxiliary power unit;
sensing a temperature of the injector and, based on the temperature, activating a coolant pump that is separate from the coolant system of the engine, the coolant pump operating in a secondary cooling system to reduce an injector temperature when the sensed temperature is or is expected to exceed a threshold temperature after the engine and the engine electrical system are shut down;
wherein the coolant pump of the secondary cooling system draws electrical power for operation from the auxiliary power unit, and
wherein a flow of electrical power to the fluid pump and to the coolant pump of the secondary cooling system is controlled by a power management module that is associated with the auxiliary power unit, the fluid pump, and the secondary cooling system.

8. The method of claim 7, wherein the secondary cooling system includes a fan disposed to provide a cooling air flow to the injector, wherein said fan is connected to the electrical system and configured to provide the cooling air flow during engine operation.

9. The method of claim 7, further comprising providing a flow of coolant through a coolant passage formed in a housing of the injector when the engine is operating, said flow of coolant operating to cool the injector.

10. The method of claim 7, further comprising a valve disposed between the coolant pump and the engine, wherein activating the secondary cooling system includes fluidly connecting the coolant pump with the coolant system of the engine when the coolant pump is activated.

11. The method of claim 7, wherein the fluid is diesel exhaust fluid (DEF) that contains an aqueous urea solution.

12. The method of claim 11, wherein the power management module operates to purge the DEF from the injector following engine shut-down by:
providing power to operate the fluid pump from the auxiliary power unit;
causing the fluid pump to operate in reverse such that it draws DEF from the injector and deposits the DEF into a reservoir; and
causing an injector valve to open while DEF is purged.

13. A method for avoiding overheating of a diesel exhaust fluid (DEF) injector disposed in an engine exhaust system following a hot engine shut-down, comprising:
activating an auxiliary power unit, which includes a battery array that is separate from a power storage device of the engine and operates to store electrical energy therein during engine operation and to selectively deliver, upon activation, electrical power after engine shut-down and deactivation of an engine electrical system;
sensing a temperature associated with the DEF injector and, when and while the temperature exceeds a predetermined threshold:
using energy from the auxiliary power unit to operate a fan providing a cooling air flow to the DEF injector;
using energy from the auxiliary power unit to operate a coolant pump that circulates a flow of coolant fluid through a passage formed in a housing of the DEF injector;
wherein a flow of electrical power to the fan and to the coolant pump is controlled by a power management module that includes a controller associated with the auxiliary power unit.

14. The method of claim 13, further comprising:
determining a presence of a failure condition that can cause an overheating condition of the DEF injector; and
activating the auxiliary power unit via the power management module to provide an emergency cooling function to the DEF injector when normal machine cooling systems are unable or incapable of providing sufficient DEF injector cooling.

15. The method of claim 13, further comprising powering a fluid pump to purge the DEF from the DEF injector.

16. The method of claim 15, wherein the power management module operates to purge the DEF from the injector following engine shut-down by:
providing power to operate the fluid pump from the auxiliary power unit;
causing the fluid pump to operate in reverse such that it draws DEF from the DEF injector and deposits the DEF into a reservoir; and
causing an injector valve to open while DEF is purged.

17. The method of claim 13, further comprising selectively fluidly connecting a coolant system of an engine with the coolant pump via a valve, said valve configured to remain closed while the engine is operating.

18. The method of claim 17, wherein the valve is configured to open automatically when the coolant pump is activated.

* * * * *